(No Model.)
W. JOHNSTON.
VARIABLE COUPLING JOINT FOR SHAFTING.
No. 276,420. Patented Apr. 24, 1883.
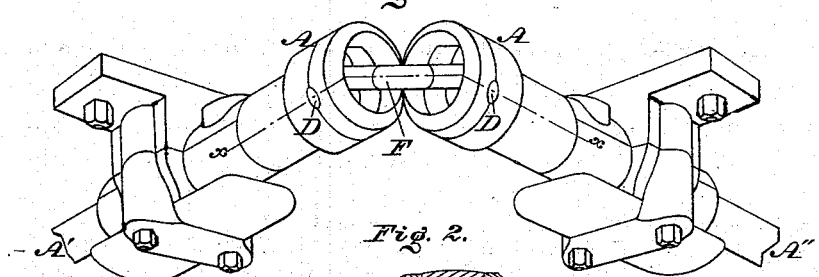
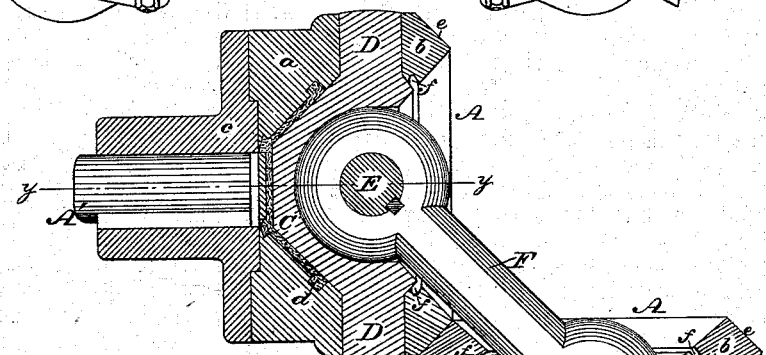
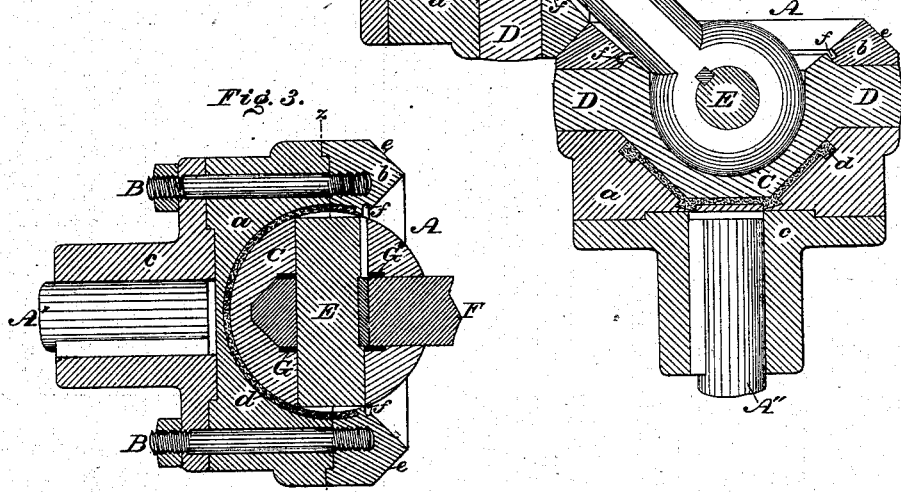
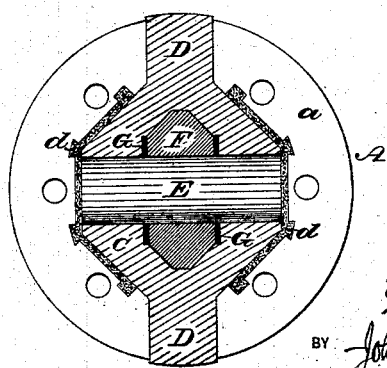
WITNESSES:
L. Douville
W. F. Kircher
INVENTOR:
Wm Johnston,
BY John A. Wiedersheim
ATTORNEY.

UNITED STATES PATENT OFFICE.

WILLIAM JOHNSTON, OF PHILADELPHIA, PENNSYLVANIA.

VARIABLE COUPLING-JOINT FOR SHAFTING.

SPECIFICATION forming part of Letters Patent No. 276,420, dated April 24, 1883.

Application filed September 26, 1882. (No model.)

*To all whom it may concern:*

Be it known that I, WILLIAM JOHNSTON, a citizen of the United States, residing in the city and county of Philadelphia, State of Pennsylvania, have invented a new and useful Improvement in Variable Coupling-Joints for Shafting, which improvement is fully set forth in the following specification and accompanying drawings, in which—

Figure 1 is a perspective view of the variable coupling-joint embodying my invention. Fig. 2 is a longitudinal section thereof, enlarged, in line $xx$, Fig. 1. Fig. 3 is a transverse section thereof in line $yy$, Fig. 2. Fig. 4 is a transverse section thereof in line $zz$, Fig. 3.

Similar letters of reference indicate corresponding parts in the several figures.

My invention relates to that class of shaft-couplings which are employed to transmit power from one rotating shaft to another, and at the same time to allow the shafting perfect freedom of motion in every direction, and at any angle within certain limits.

The invention consists of the construction of the couplings, whereby they are compact, reduced in expense, stronger and more durable, they work with less friction and noise, and are more readily set up and taken apart, provision also being made for lubricating the parts.

Referring to the drawings, A A represent the two heads of the coupling, each of which is formed of sections $a\,b\,c$, which are connected by means of bolts B B, the ends of the shafts A' A'' being secured to the sections $c$. The sections $b\,c$ may, however, be formed in one piece without affecting the operation of the coupling. In the section $a$ is a depression for the reception of an oscillating block, C, which is formed with journals D, which rest on the sections $a$, and are retained by the section $b$, the latter being of annular form. In the block C is an opening extending at a right angle to the journal D, and receiving an oscillating pin, E, to which is keyed or otherwise secured one end of the coupling-link F, whose end also enters an opening in the block C, it being noticed that the said link connects the two heads of the coupling, as shown in Figs. 1 and 2. To the faces of the sections $a\,b$ of the head, contiguous with the body of the block C, is secured Babbitt or other anti-friction metal, $d$, which receives the wearing action of the block on the head. The outer face of the section $b$ is beveled, as at $e$, the bevel-faces of the sections of the two heads being in contact, so that the two heads run with less noise and more ease, and they are somewhat sustained on each other. In the construction of the sections $b$ the angle of the beveled faces will be adjusted relatively to the angle at which the shafts A' A'' are set or supported.

In order to set up the coupling, the section $b$ of the head is removed. One end of the link is introduced into the block C, and the pin E passed through the block and eye of the link. The section $b$ is then restored and secured by the bolts B, thus confining the block C, and consequently the pin E and end of the link, in position. When power is communicated to one of the shafts A' or A''—say the shaft A'—rotary motion is imparted to the connected head, and oscillating motions are imparted to the block C and pin E and rotary motion is imparted to the link. This causes a rotation of the other head, and consequently of the shaft A'', it being noticed that the block C and pin E of the latter-named head oscillate or rock similar to those of the first-named head.

It will be found that the coupling is compact, strong, and durable, and may be produced at less expense, and that it works with reduced friction, and consequently greater ease and less noise than heretofore.

On the inner face of the annular section $b$ of the head A is a groove, $f$, the walls of which are adjacent to the journal portion of the oscillating block C. By this provision said block may be fully lubricated, the upper or outer wall of the groove overhanging to prevent loss of the lubricant.

Owing to the annular form of the section $b$, the head of the link F may be readily lubricated by oil or lubricant admitted through said section.

Interposed between the sides of the head of the link and the contiguous faces of the oscillating block are washers G, of compressed paper or other suitable material, their object being to receive the wear of the contiguous parts of the link and block.

Having thus described my invention, what I claim as new, and desire to secure by Letters Patent, is—

1. In a variable coupling-joint for shafting, a pair of heads on the respective shafts, a pair of blocks oscillating in said heads, a link having its ends arranged to turn in recesses of said blocks, and a pair of oscillating pins attached respectively to said blocks and passing through the ends of said link, substantially as set forth.

2. In a variable coupling-joint for shafting, a pair of heads on the respective shafts, consisting of sections a and b, a pair of blocks oscillating in said heads, a rigid link having its ends arranged to turn in recesses of said blocks, and a pair of oscillating pins attached to said blocks and passing through the ends of said link, substantially as set forth.

3. In a variable coupling-joint for shafting, the heads having beveled faces which are in contact, and operate after the manner of frictional gearing, substantially as and for the purpose set forth.

4. In a variable coupling-joint for shafting, a head recessed to receive an oscillating block provided with an independently-oscillating pin, in combination with a lining of anti-friction metal for the recess of said head, and protecting said block and the ends of said pin, substantially as set forth.

5. In a variable coupling-joint for shafting, a recessed head, an oscillating block turning in said head and an oscillating pin turning in said head, and adapted to pass through the end of a link, substantially as set forth.

6. In a variable coupling-joint for shafting, an oscillating block for connection to the link, in combination with the recessed head in which said block turns, the said head having a lubricant-receiving groove formed in its face around said head, substantially as set forth.

WILLIAM JOHNSTON.

Witnesses:
JOHN A. WIEDERSHEIM,
A. P. GRANT.